Dec. 11, 1934.  A. WINTHER ET AL  1,983,827

TRANSMISSION

Original Filed Sept. 15, 1933

Anthony Winther,
Martin P. Winther,
Inventors.
Delos G. Haynes,
Attorney.

Patented Dec. 11, 1934

1,983,827

UNITED STATES PATENT OFFICE 1,983,827

TRANSMISSION

Anthony Winther, Kenosha, Wis., and Martin P. Winther, Waukegan, Ill.

Original application September 15, 1933, Serial No. 689,618. Divided and this application March 12, 1934, Serial No. 715,140

2 Claims. (Cl. 74—336.5)

This invention relates to transmissions, and with regard to certain more specific features, to transmissions for connecting a variable-speed prime mover with a driven member.

This is a division of our patent application for air conditioner, serial number 689,618, filed September 15, 1933.

Among the several objects of the invention may be noted the provision of a transmission for connecting a variable speed prime mover with a driven member in such a manner as to permit of high-speed drive under normal conditions, and a low-speed drive under predetermined high, prime mover speed; and the provision of apparatus of the class described which is simple in construction and reliable in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a side elevation of the apparatus, parts being broken away as shown in section;

Similar reference characters indicate corresponding parts throughout the several views of the drawing.

Figure 1:
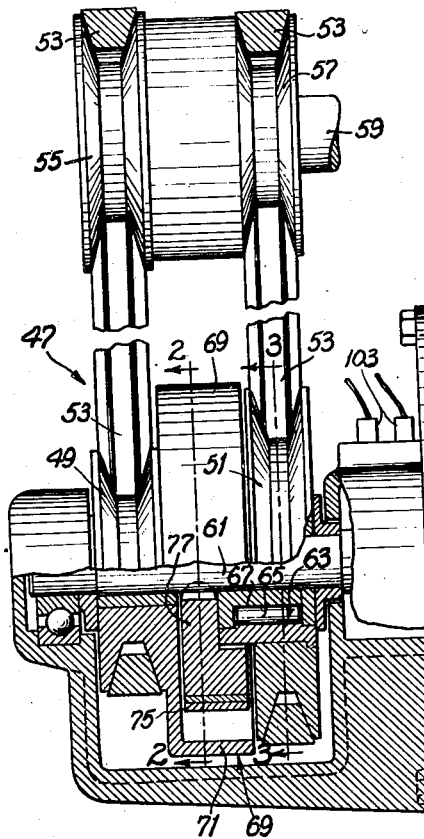

Referring now more particularly to Fig. 1, there is shown at numeral 13 a refrigerator compressor which is to be taken as exemplary of a member which is adapted to be driven from a shaft such as is shown at numeral 59, said shaft 59 being driven by a variable-speed, prime mover. Accordingly, the shaft 59 operates at variable speed. The driven shaft, that is, the shaft connected to the driven member is indicated at numeral 61.

The compressor 13 is driven by means of a compressor drive 47 (the subject matter of this invention) which comprises pulleys 49 and 51 driven by suitable belts 53 from pulleys 55 and 57 fastened to a shaft 59 which is driven from the engine shaft. The pulley radii are of such size that the angular velocity ratio between pulleys 55 and 49 is higher than that between pulleys 57 and 51. Therefore, with the same engine shaft speed, and consequently, the same speed of shaft 59, the pulley 49 is driven at a higher speed than pulley 51.

Figure 3:
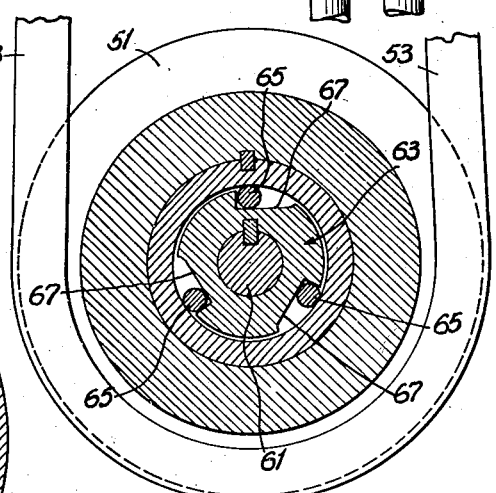
Fig. 3 is a vertical section taken on line 3—3 of Fig. 1.

Pulley 51 drives the shaft 61 by way of an overrunning clutch 63, shown in Fig. 1 and detailed in Fig. 3. This clutch has clutching balls 65 and wedging recesses 67 so arranged between the shaft 61 and the pulley 51 that as long as the pulley 51 tends to overrun the shaft 61, the pulley drives said shaft; whereas when the shaft 61 overruns the pulley 51, they are disconnected. It will be understood that the particular form of overrunning clutch used is exemplary and that other forms may be used.

Figure 2:
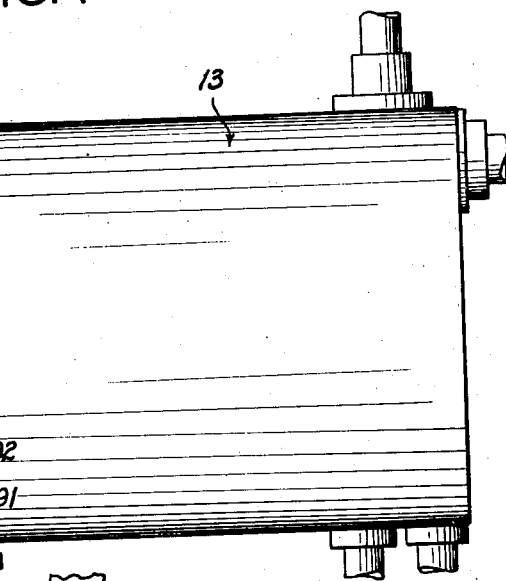
Fig. 2 is a vertical section taken on line 2—2 of Fig. 1.
Figure 2:
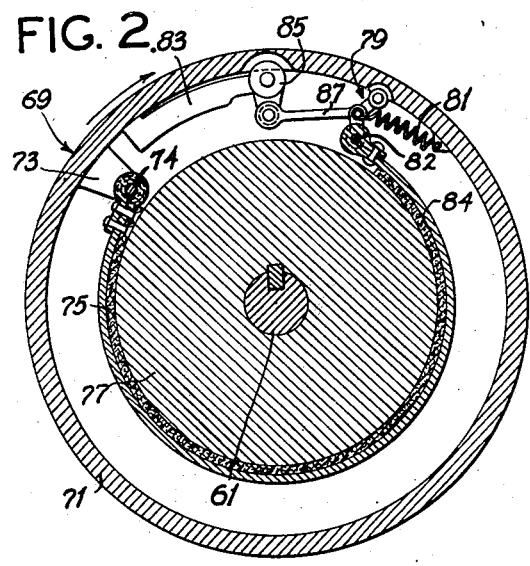

The shaft 61 overruns the pulley 51 under driving conditions from the pulley 49 which operates at a higher angular velocity than pulley 51. Pulley 49 is connected with said shaft 61 by way of a centrifugal clutch 69, shown in Fig. 1 and detailed in Fig. 2. This centrifugal clutch comprises a bell flange 71 formed integrally with the pulley 49 and carrying a lug 73 to which is pivoted a clutch band 75. This band 75 is engageable and disengageable with a drum 77 which in turn is keyed to said shaft 61. The other end of the clutch band is articulated with the drum 71 by means of a toggle linkage 79 which is normally, at low speed, drawn into clutch engaging position by a spring 81. At a predetermined high speed, a weight 83 forming a part of a bell crank 85 moves outwardly under centrifugal force. The outward movement is transmitted by means of a link 87 to said toggle linkage 79 and against the reaction of spring 81. This action causes the band 75 to leave the drum 77 at a predetermined high speed and thus to cut out the drive from pulley 49 (see Fig. 2).

Under low speeds, the spring 81 pulls the toggle 79 (and link 87) to the right, and it will be noted that the primary movement of the pivot 82 must be around the pin joint 74 between the band 75 and lug 73, because the pivot point 82 is on the band 75 which is pivoted at 74. Thus the point 82 moves toward the drum 77 under pull from the spring 81. This movement is only slight before the drum is contacted. The constraint of the material of band 75 resists tangential movement. Hence the spring 81 tends to straighten the toggle 79. Movement of the pivot 82 toward the drum contacts the region 84 of the band 75 with the drum 77. Thereafter, the clockwise rotation of point 74 functions to wrap the band 75 on the drum 77, as in the case of the ordinary self-energizing band clutch and increasing friction finally stops relative movement.

When the centrifugal force of the weight 83 comes into play, it will cause a cancellation of the pull of spring 81 on the toggle 79. Hence the toggle collapses and the joint 82 moves in the opposite direction away from the drum 77. Without the incipient contact at region 84, the self-closing clutch will not be able to close under advance of pivot 74 clockwise.

In one application, the centrifugal clutch 69 is designed to close when the pulley 49 revolves less than, say 1500 R. P. M. At speeds in excess of this the clutch opens. When the clutch 69 is engaged, pulley 51 is overrun by shaft 61 because of the overrunning clutch 63. Thus at low engine speed the pulley 49 causes and controls rotation of the shaft 61; whereas at high engine speed, the clutch opens and pulley 51 causes and controls the rotation of shaft 61. This method of driving provides a simple, compact and inexpensive speed limiting means for the compressor 13.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

We claim:

1. A drive operable from a variable speed prime mover, comprising a driving member driven according to prime mover speed, a driven member, a plurality of intermediate drivers for the driven member, each intermediate member having a driving connection with said driving member, but the velocity ratios of said connections being high and low respectively, whereby one intermediate member is driven at a relatively high speed and the other at a relatively low speed, a centrifugal clutch articulating the high-speed intermediate member with the driven member adapted to open at a predetermined high speed and an overrunning clutch connecting the low-speed intermediate member with the driven member, permitting the high-speed intermediate member to normally drive and permitting the low-speed intermediate member to drive under predetermined conditions of high prime mover speeds.

2. A transmission comprising a variable speed driver, a driven member, two driving mechanisms mechanically connecting the driver with the driven member, one of which provides a relatively high speed drive and the other of which provides a relatively low speed drive, an overrunning clutch connecting the low speed drive with the driven member whereby the high speed drive in normally driving the driven member overruns the low speed drive, and speed responsive disconnecting means associated with the high speed driving mechanism adapted to disconnect the high speed driving mechanism from the driven member at a predetermined high speed of the driving member whereby the driven member ceases to overrun the relatively low speed driving member and whereby said low speed driving mechanism drives the driven member under conditions of high speed of the driving member.

ANTHONY WINTHER.
MARTIN P. WINTHER.